W. S. HADAWAY, Jr.
HEATER.
APPLICATION FILED MAR. 11, 1913.
1,096,908.
Patented May 19, 1914.
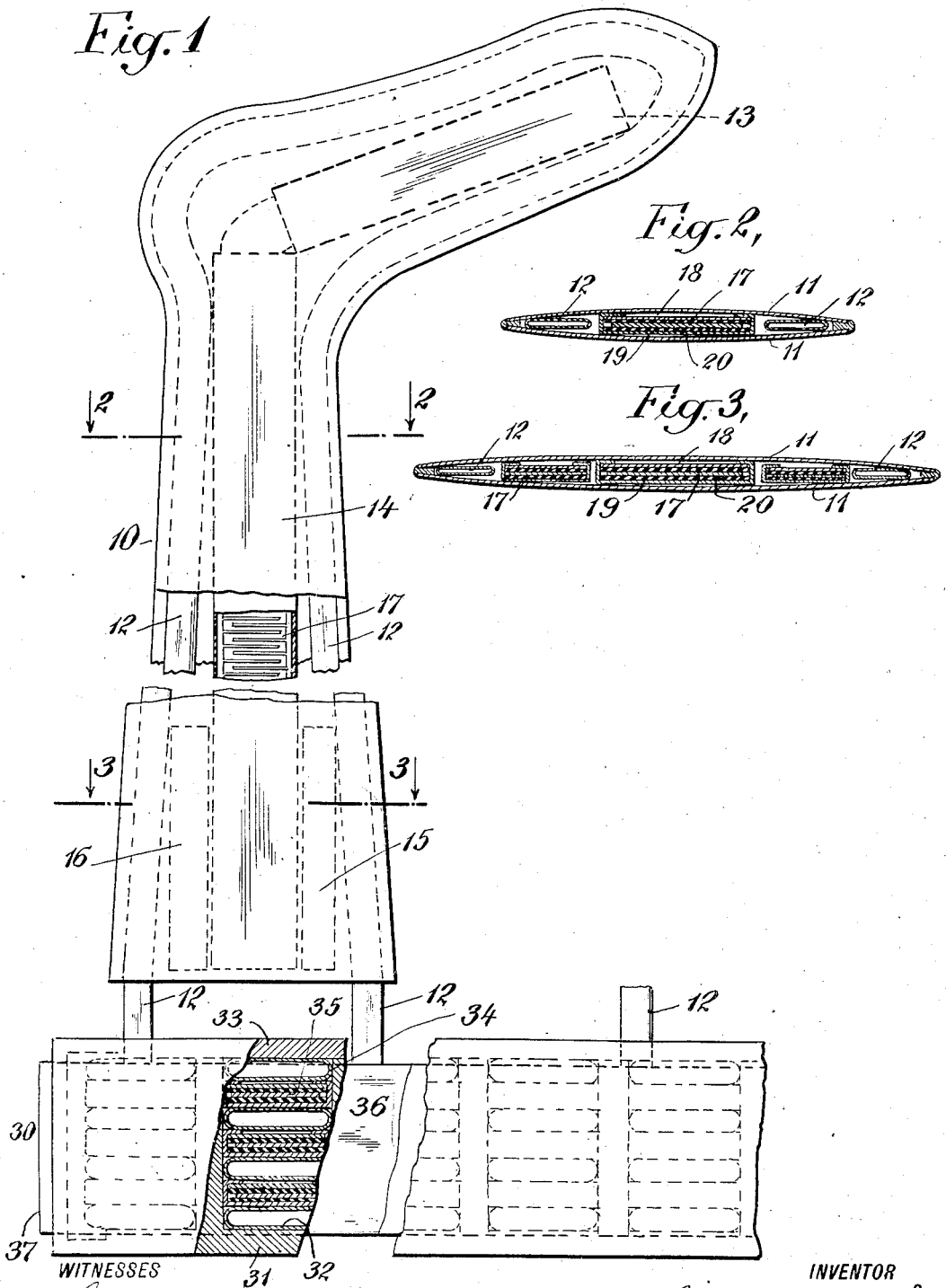

UNITED STATES PATENT OFFICE.

WILLIAM S. HADAWAY, JR., OF NEW ROCHELLE, NEW YORK.

HEATER.

1,096,908.   Specification of Letters Patent.   Patented May 19, 1914.

Application filed March 11, 1913. Serial No. 753,505.

*To all whom it may concern:*

Be it known that I, WILLIAM S. HADAWAY, Jr., a citizen of the United States, and a resident of New Rochelle, in the county of Westchester and State of New York, have invented certain new and useful Improvements in Heaters, of which the following is a specification, reference being had to the accompanying drawings, forming a part thereof.

My invention relates to heaters and has special reference to such as embody electrically heated steam generators.

One object of my invention is to provide a simple and durable heater that shall possess the advantages of both a steam heater and an electric heater without having the disadvantages of either.

Another object of my invention is to provide a heater of the aforesaid character that shall be adapted for supplying heat intermittently or periodically to work having a relatively large and a varying heat capacity.

Other objects will be set forth hereinafter.

I will describe my invention in the following specification and point out the novel features thereof in appended claims.

Referring to the drawings: Figure 1 is an elevation of a heater constructed in accordance with my invention and embodying a stocking mold, certain of the parts being broken away to disclose the heater elements. Figs. 2 and 3 are transverse sections on the lines 2—2 and 3—3 of Fig. 1.

Like characters of reference designate corresponding parts in all the figures.

With special reference to Figs. 1, 2 and 3, a stocking mold 10 is partially heated by steam which is supplied to it from a steam generator 30. Only one mold is shown but several molds may, and probably will be supplied from the same generator.

The mold comprises a flat hollow metal body 11 which is so formed as to produce the desired shape in a stocking which is stretched and dried upon it. The shape of the mold will depend upon the use to which it will be put and is not essential to my invention.

Within the hollow body is a flattened tube 12 which is bent around the edge of the mold and constitutes a steam passage, and electric heater units 13, 14, 15 and 16. Each of the heater units is flat and preferably rectangular in form and comprises a resistance ribbon 17, having transverse slots cut alternately from opposite edges in a well known manner, insulating strips 18 and 19 and a metal sheath 20.

The units 13 and 14 are respectively placed in the center of the foot and leg of the mold and the units 15 and 16 are placed one on each side of the unit 14 near the bottom end of the mold. The hollow body is thus substantially filled by the steam tube and the heater units together.

As hereinafter more fully pointed out, the heater units 13 to 16 inclusive are not solely depended upon for supplying heat to the mold but are particularly advantageous in supplementing the steam tubes, in supplying heat to the portions of the mold where the demand is greatest and for preventing the condensation and accumulation of water in the steam tube at these points. Inasmuch as stockings, as usually constructed, are reinforced at the toe and heel and at the top, it requires much more heat at the corresponding points in the mold, during the process of stretching and drying the wet stocking.

The heater units 15 and 16 assist in preventing condensation in the steam tubes near the bottom of the mold (corresponding to the top of the stocking) and the heater unit 13 prevents condensation in the steam tube at the toe and heel of the mold.

The generator 30 may be of any suitable structure, I have shown for convenience, a heat generator which is arranged and constructed like that shown in my co-pending application Ser. No. 749,596 filed February 20th, 1913. This generator comprises a body 31 having a plurality of substantially parallel grooves or channels 32, and a cover plate 33. In the channels are disposed a plurality of flattened tube sections 34 which are spaced apart by electric heater units 35. Each of the units may be similar in construction to the units 13 to 16 above described. The flattened tube sections are closed at one end and at the other extend outwardly from the body of the generator and are sealed into the header 36 which establishes a communication between them. The header is provided with end caps 37 and the respective ends of the flattened tube 12 are connected to it and communicate with it.

The tube system composed of the header, the flattened tubes of the generator and the steam tube 12 of the mold, is partially filled with water and operates as a closed system to which water is only supplied to compensate for leakage. The water may be supplied in any suitable way, as for example, by pouring it through a funnel (not shown) connected to the system as in my co-pending application Ser. No. 749,595 filed February 20th, 1913.

When a heater such as a stocking mold is in service a large amount of heat is drawn from the mold when the wet stocking is applied to it and since the stocking is usually reinforced at the toe and heel, a larger amount of heat is necessary to dry out these portions as already pointed out. Considerable difficulty is experienced in obtaining a mold of suitable shape and size to which sufficient heat is applied to maintain the proper temperature under such extreme conditions as exist when the wet stocking is first applied. If electric heaters alone are utilized, it is difficult to obtain such a distribution of heat as to avoid one part of the stocking being dried out more rapidly than the other parts. The mold is thin and its heat capacity is necessarily small so that the temperature of the mold is likely to be materially reduced at the time the stocking is applied.

If a steam heated mold is utilized, the steam passages are liable to become clogged with condensed water by reason of their small size in cross section and the sudden demand for a large quantity of heat relative to the heat capacity of the mold.

With the arrangement of my present invention, however, the steam generator which is outside of the heated mold may readily be made of ample capacity to supply heat to the mold and maintain a fixed temperature even when the demand is relatively great. At the same time water cannot accumulate if any is condensed in the mold by reason of the fact that the electric heater units which form a part of the mold supply sufficient heat to vaporize it when the load is reduced. It is thus evident that the heater is essentially a closed steam heater the working body of which is provided with a simple and automatic means for insuring perfect drainage under periodic application of relatively large load.

The stocking mold heater illustrated is only one form and the matrix press heater another form of my invention, which is equally applicable to glove molds and to various uses that will determine to a greater or less degree the size and shape of the mold or heated body.

What I claim is:

1. A heater comprising a solid heated body having a steam passage, a steam generator outside of the solid body communicating with the passage, and means in the solid body for imparting heat to the passage.

2. A heater comprising a solid heated body having a steam passage, a steam generator outside of the solid body communicating with the passage, and an electric heater in the solid body for imparting heat to the passage.

3. A heater comprising a heated body having a steam passage, a steam generator outside of the body communicating with the passage and comprising a fluid containing chamber, and electric heater elements for imparting heat thereto, and means in the body for imparting heat to the passage.

4. A heater comprising a heated body having a steam passage, a steam generator outside of the body communicating with the passage and comprising a fluid containing chamber, and electric heater elements for imparting heat thereto, and electric heater elements in the body for imparting heat to said passage.

5. A heater comprising a heated body having a steam passage and shaped to conform to the work to which it is adapted to transfer heat, an electrically heated steam generator outside of the heated body and arranged to supply steam to said passage, said body comprising an electric heater arranged to supply heat to said passage, whereby the water condensed in the passage when the work is applied is vaporized when the work is removed.

6. A heater comprising a heated body having a steam passage adapted to be subjected periodically to a relatively large load, electric heater units arranged to impart heat directly to the passage and a steam generator outside of the body arranged to supply steam to said passage.

7. A heater comprising a stocking mold having steam tubes therein, an electric element arranged to impart heat to the steam tubes and a steam generator outside of the mold arranged to supply steam to the tubes.

8. A heater comprising a heated body having a steam passage, a steam generator communicating with said passage and means associated with the body for imparting heat thereto and directly to the passage to vaporize the condensed water in the passage.

9. A heater comprising a mold of definite shape having a steam passage, a steam generator outside of the mold communicating with the passage, and means in the mold for imparting heat to the passage.

10. A heater comprising a mold of definite shape having steam tubes therein, an electric element arranged to impart heat to the steam tubes, and a steam generator outside of the mold arranged to supply steam to the tubes.

In witness whereof, I have hereunto set my hand this 4 day of March in the year 1913.

WILLIAM S. HADAWAY, Jr.

Witnesses:
R. J. DEARBORN,
F. GRAVES.